United States Patent Office 3,418,042
Patented Dec. 24, 1968

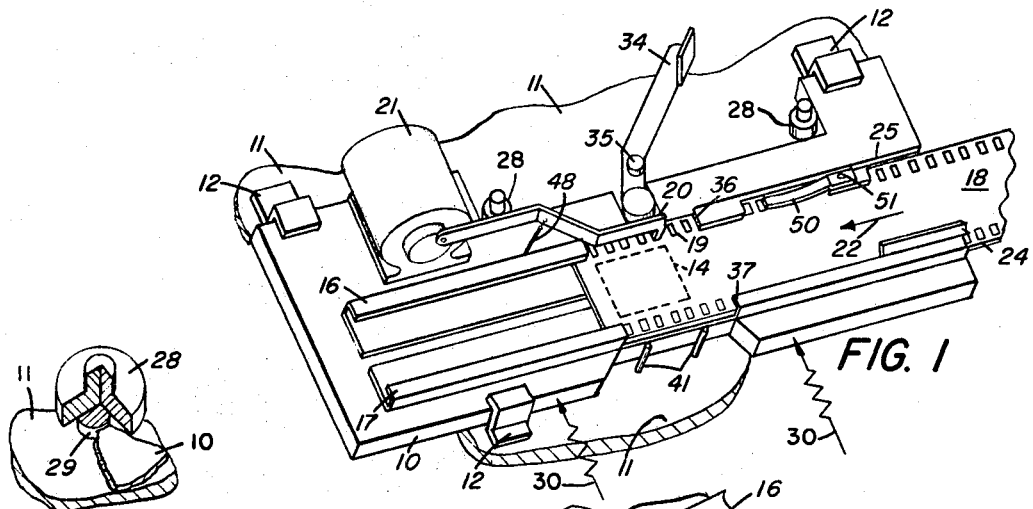
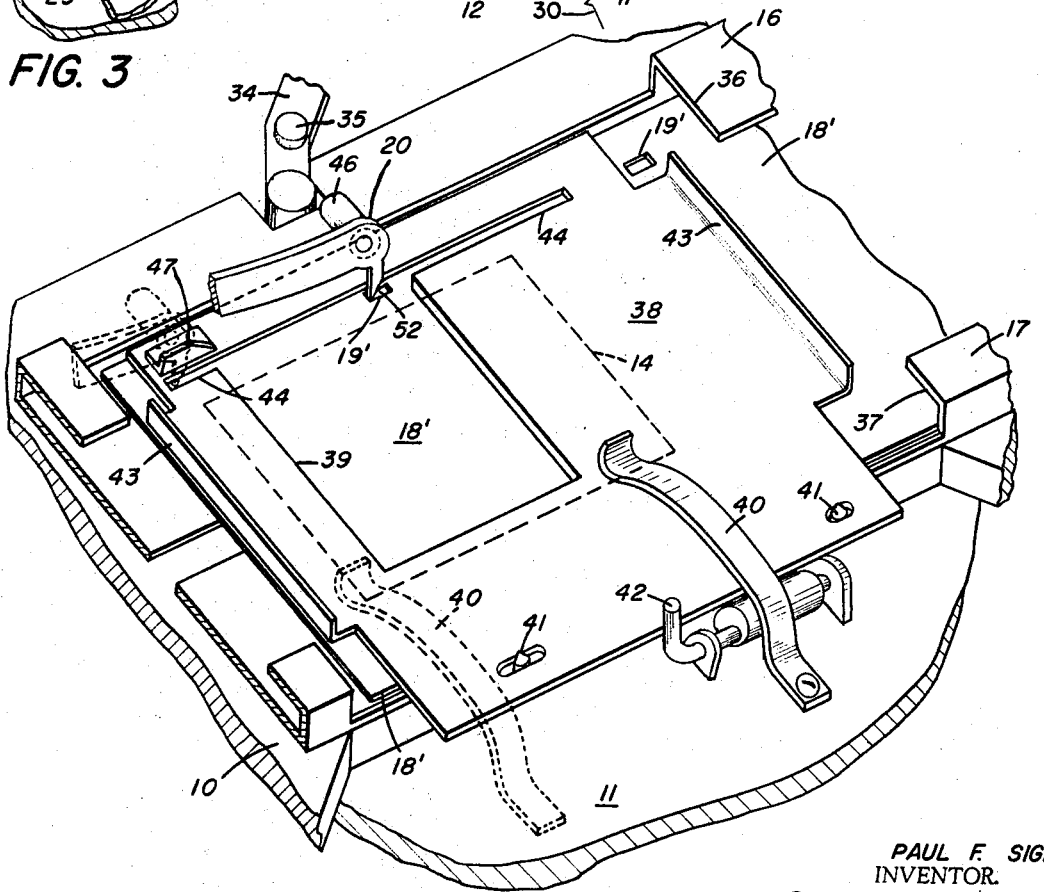

3,418,042
MEANS FOR HOLDING AND PERIODICALLY ADVANCING A STRIP OF FILM OR THE LIKE
Paul F. Sigl, Rochester, N.Y., assignor to Eastman Kodak Company, Rochester, N.Y., a corporation of New Jersey
Filed Oct. 22, 1965, Ser. No. 500,990
6 Claims. (Cl. 353—18)

ABSTRACT OF THE DISCLOSURE

A device for holding and periodically advancing a strip of negative film in a projection printer including a guide track and a claw. The claw is driven through a cycle of operation including an advance stroke for moving the film with respect to the guide.

---

The present invention relates to an automatic device for holding and periodically advancing a strip of negative film, said device being particularly adapted for use with projection printers.

In the art of projection printing, as distinguished from contact printing used in motion picture film art, it has been the practice of a printer-operator to advance the film to a specific location relative to a framing aperture prior to directing printing light through the film to obtain an image on a printing paper. With practice, such operators become skilled in positioning the film quickly so as to properly frame each negative. However, when making single print copies from a large number of negatives, considerable set-up time is accumulated during a series of printing cycles. Also, not all persons operating such projection printers are skilled enough to reduce set-up time to a minimum. Thus, there has existed for some time a need for a device which will simplify such positioning techniques. Since several of the most extensively used film types have apertures adjacent to the image area, it is now feasible to use these apertures to control the film advance.

Therefore, an object of the present invention is to provide an automatic device for holding and periodically advancing negative film wherein a film having apertures adjacent to the film image area is advanced in a projection printer to a framing aperture by a claw engaging one of the film apertures and having a specific drive stroke relative to the framing aperture.

In accordance with one embodiment of my invention, the usual framing negative holder for guiding a film in a projection printer is replaced by a claw-drive system when using film having apertures. The claw advances the film by drivingly engaging one of the apertures thereof, moving it past the illumination aperture of a projection printer. Upon completion of the exposure of one frame, the claw is energized to advance a next image into the printing position. The flatness of the film is assured by placing an apertured guide plate over the film, in the region of the framing aperture. Spring means are provided to clamp the guide and thus maintain a flat film surface throughout the exposure cycle.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

FIG. 1 is a simplified perspective view of one embodiment of this invention;

FIG. 2 is an enlarged detail perspective view of a portion of an embodiment similar to the equipment shown in FIG. 1; and FIG. 3 is a detail view of one of the adjustment mechanisms of the present invention.

Referring now to the drawing, wherein like numbers indicate similar parts, I have shown a flat transport surface 10 movable over a table indicated at 11 in guide means 12. The transport surface 10 and table 11 define therethrough an illumination aperture indicated in dashed lines at 14 lying within the path of a guide track having two guide rails 16 and 17 which guide a film strip 18 therethrough. The particular film strip illustrated in FIG. 1 is a 35 mm. film strip having a plurality of perforations or apertures 19 one of which is being selectively engaged by a claw 20. The claw 20 is driven by a motor 21 to advance the film strip 18 in a direction as indicated by an arrow 22 between each exposure cycle. Initial insertion of the film strip 18 in the lead-in end of the guide track 16–17 is facilitated by a raised flap 24 in the rail 17 and a cut-away section 25 of the rail 16.

It should be noted that the transport surface 10 and guide track 16–17 are adjustable slightly laterally whereby film strips of somewhat different configurations may be guided over the illumination aperture 14. For instance, the 35 mm. film has apertures 19 on both sides whereby the image is centered on the film, while another film has apertures on one side and the image area is not centered. The positioning adjustment of about .08 inch is accomplished by a pair of knobs 28 which are mounted on support table 11 and each has a cam surface 29 (FIG. 3) which engages an edge of transport surface 10 so that rotation of the knobs laterally positions surface 10. Once the positioning is established by adjustment of the knobs 28, the transport surface 10 and track 16–17 are held in place against the cam surfaces 29 by spring diagrammatically shown at 30.

Longitudinal adjustment of the claw 20 relative to the position of the illumination aperture 14 is accomplished by a lever 34 mounted on the support table 11 and pivotable about a bolt 35 mounted on table 11. An end portion of lever 34 fits within a recess in the side edge of surface 10 so that pivotal movement of the lever 34 moves the surface 10 longitudinally within guide members 12.

Referring now to FIG. 2, a film 18′ is indicated as having one aperture 19′ per frame, as in the now popular #126 film. As shown more clearly in FIG. 2, the rails 16 and 17 have gaps 36 and 37 respectively in the region of the illumination aperture 14 in which an upper guide plate 38 is placed over the film to maintain it flat for focusing considerations. The plate 38 has a framing aperture 39 which corresponds to the film image size and masks a portion of the illumination aperture 14. The guide plate 38 is held in position by at least one spring clamp 40 (a second being indicated in dashed lines in FIG. 2) which maintains the plate on solid pins 41 secured to the table 11. Thus, adjustment of the lever 34 moves the film 18 and the tracks 16–17, but not the plate 38. The spring 40 clamp may be moved from the surface of the plate 38 to release it by a cam lifter 42 when it is desired to replace the plate 38 because of a change of film image size. The leading and trailing lower edges 43 of the plate 38 are curved to facilitate threading of the film strip and to prevent damage thereof. The film support plate 38 also defines therein a longitudinal slot 44 which allows driving motion of the claw 20.

The claw 20 is supported at an elevation which will maintain engagement of the claw with a film aperture during the advance stroke of the claw movement by a roller 46. In order to regulate precise film advance, the roller 46 moves onto a ramp surface 47 on the plate 38 whereby the claw 20, as shown in dashed lines, is withdrawn from the aperture 19' of the film, to terminate the film advance operation. The ramp surface remains fixed on the plate 38, but the claw 20 and film 18 are positioned by adjustment of the lever 34 so as to properly position each frame within the aperture 39. In addition to the weight of the claw 20, I prefer to use a soft hold-down spring means 48 (FIG. 1) to assure positive engagement of the desired aperture (19 or 19').

As mentioned above, when the image of the film is not precisely aligned with the aperture 39, the adjustment lever 34 is moved to make final longitudinal corrections. Since, by present practices, all #126 films are preframed relative to the film aperture 19', only one such adjustment is required for this size film. However, some 35 mm. cameras position the film in slightly different exposure positions relative to the apertures 19. Therefore, it is sometimes necessary to correct the position of the lever 34 for each film strip 18.

Once the initial set-up positioning is accomplished, the system is energized whereby the projection printer illuminates the illumination aperture 14 for a period sufficient to expose a printing paper. Since several such projection printers are known, this portion of the equipment need not be explained in detail here. In one such equipment, the printing paper is maintained a fixed distance above the illumination aperture 14 so that good print exposure may be accomplished in a preselected period, corrections being made for color variations or film density as required.

In accordance with my invention, the signal information that terminates the exposure illumination also energizes the motor 21 for one revolution whereby a next film image is properly positioned without further effort on the part of the operator. If no changes of color correction etc. are required, the next print is made automatically.

The film (18 or 18') is prevented from moving in the wrong direction by additional clamping means indicated as a spring 50. This spring 50 is placed over the apertured edge of the film so as not to damage the image area and is compressed by a fastening means such as a tension screw 51. The spring 50 pressure is increased by tightening of the screw 51. This tightening develops a holding force strong enough to overcome the force developed by the return stroke of the claw 20. Also the claw 20 is provided with a tapered edge 52 so as to exert substantially reduced return stroke driving force on the film.

While I have shown particular embodiments of this invention, modifications thereof will occur to those skilled in this art. I intend, therefore, to have the appended claims cover such embodiments as properly fall within the scope of the present invention.

I claim:

1. For use in a projection printer, means for holding a strip of film having a plurality of images and for advancing the film between exposure cycles of the printer, said film being provided with an aperture adjacent each image, said holding and advancing means comprising:
   a guide track having an illumination aperture therein;
   a claw for engaging an aperture of the film to advance the film;
   means operable between exposure cycles for intermittently driving said claw to advance the film along said guide track by a distance sufficient to move one image from the aperture and bring another image to the aperture;
   a film guide positionable with respect to said film to constrict movement of said film away from said guide track, said film guide having a framing aperture aligned with said illumination aperture, the size of the framing aperture corresponding to the size of the images of the film;
   roller means supporting said claw at a position to maintain engagement of the claw with the film aperture during film advancing movement of the claw; and
   spring means biasing said claw toward the film and urging said roller into engagement with a surface of said film guide during film advancing movement of the claw.

2. Holding and advancing means as set forth in claim 1 wherein said film guide is provided with a ramp surface for raising said claw thereby to terminate the film advancing stroke of the claw at a specific location relative to the framing aperture.

3. For use in a projection printer, means for holding a strip of negative film having a plurality of images and for advancing the film between exposure cycles of the printer, said film being provided with an aperture adjacent each image, said holding and advancing means comprising:
   a guide track having an illumination aperture therein;
   a claw for engaging an aperture of the film to advance the film;
   means operable between exposure cycles for intermittently driving said claw to advance the film along said guide track by a distance sufficient to move one image from the aperture and bring another image to the aperture;
   a film guide positionable with respect to said film to constrict movement of said film away from said guide track, said film guide having a framing aperture aligned with said illumination aperture, the size of the framing aperture corresponding to the size of the images of the film;
   said guide track being engageable with the film on at least three sides to guide the film in a preselected path;
   means for clamping the film against longitudinal movement during exposure and during the return stroke of said claw; and
   said guide track having a lead-in end provided with a raised guide flap to facilitate insertion of the film strip therein.

4. Means for holding and periodically advancing a strip of film having a plurality of images and a plurality of apertures, said holding and advancing means comprising:
   means defining a film guide track along which film can be advanced;
   means defining an image framing aperture through said guide track;
   a claw for advancing the film with respect to said framing aperture;
   means for driving said claw through a cycle of operation comprising:
      (1) an advance stroke during which said claw is engageable with an aperture in the film for advancing the film with the claw, and
      (2) a return stroke during which the claw is moveable with respect to the film;
   means urging said claw into engagement with an aperture in the film during the advance stroke of the film;
   means for removing the claw from a film aperture during the advance stroke, thereby terminating film advancing operations; and
   means for holding the film against movement with respect to said track during the return stroke of said claw.

5. Holding and advancing means as set forth in claim 4 further comprising means for adjusting the position of said framing aperture with respect to said guide track.

6. Holding and advancing means as set forth in claim 4 further comprising a plate adjustable along said guide track for confining the film within the track along one portion of the track, and said claw removing means comprises a ramp secured to said plate.

References Cited

UNITED STATES PATENTS 3,194,114  7/1965  Weinberg _____ 88—24

NORTON ANSHER, *Primary Examiner.*

R. A. WINTERCORN, *Assistant Examiner.*

U.S. Cl. X.R.

95—75; 352—191; 353—76; 226—120